United States Patent
Ohnishi et al.

(10) Patent No.: US 6,548,923 B2
(45) Date of Patent: Apr. 15, 2003

(54) TWO-PHASE HYBRID TYPE STEPPING MOTOR

(75) Inventors: Kazuo Ohnishi, Gunma (JP); Masafumi Sakamoto, Gunma (JP); Koki Isozaki, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 28 days.

(21) Appl. No.: 09/821,693

(22) Filed: Mar. 29, 2001

(65) Prior Publication Data

US 2001/0038249 A1 Nov. 8, 2001

(30) Foreign Application Priority Data

Mar. 29, 2000 (JP) .......................... 2000-091108
Aug. 3, 2000 (JP) .......................... 2000-235491

(51) Int. Cl.[7] .............................................. H02K 37/00
(52) U.S. Cl. ................... 310/49 R; 310/67 R; 310/252; 310/261
(58) Field of Search ............................... 310/49 R, 49, 310/156.62

(56) References Cited

U.S. PATENT DOCUMENTS

| | | | |
|---|---|---|---|
| 4,712,028 A | * 12/1987 | Horber | 310/49 R |
| 5,708,310 A | 1/1998 | Sakamoto et al. | 310/49 |
| 6,057,613 A | * 5/2000 | Trago | 310/49 R |

FOREIGN PATENT DOCUMENTS

| | | |
|---|---|---|
| JP | 02005420 | 9/1991 |
| JP | 04210761 | 7/1992 |
| JP | 09037537 | 2/1997 |

* cited by examiner

*Primary Examiner*—Nestor Ramirez
*Assistant Examiner*—Iraj A Mohandesi
(74) *Attorney, Agent, or Firm*—Patterson, Thuente, Skaar & Christensen, LLC

(57) ABSTRACT

The permeance between the small teeth provided on the stator magnetic pole and the rotor magnetic pole may be varied regularly according to the rotation of the rotor. The small stator teeth provided on the tip end of each stator magnetic pole are divided into sets of two or three small stator teeth and at least one pitch of the adjacent teeth is different from the other pitch of the other adjacent teeth, so that the vector sum of the quaternary harmonics of permeance in each set is substantially zero. The small stator teeth formed on the tip end of the stator pole are composed of two sets of three small stator teeth, and at least one pitch of the adjacent teeth is different from the other pitch of the other adjacent teeth, so that a vector sum of the tertiary harmonics of permeance of the three small stator teeth included in each of sets becomes substantially zero, and that a vector sum of permeances of axialsymmetric two small stator teeth on the quaternary harmonic plane of two sets becomes substantially zero.

7 Claims, 15 Drawing Sheets

(a) $0 \leq x < |\alpha - \beta| T$ ($\alpha \geq \beta$)

$\alpha + \beta \leq 1$ $\alpha + \beta > 1$

STATOR SMALL TOOTH WIDTH: 0.84

ROTOR SMALL TOOTH WIDTH: 0.75

STATOR SMALL TOOTH WIDTH $t_3, t_4$ : 0.7, REMAINDER : 0.85

ROTOR SMALL TOOTH WIDTH: 0.75

(TERTIARY HARMONIC SPACE)

(QUATERNARY HARMONIC SPACE)

TWO-PHASE HYBRID TYPE STEPPING MOTOR

BACKGROUND OF THE INVENTION

1. Field of the Invention

The present invention relates to a two-phase hybrid type stepping motor, and more particularly to a two-phase hybrid type stepping motor having a structure capable of reducing cogging torque and improving a torque waveform.

2. Description of the Prior Art

As shown in FIGS. 1A, 1B and 1C, a conventionally implemented two-phase hybrid type stepping motor is composed of a stator 5 having eight magnetic poles 2 arranged on the inner periphery of an annular yoke 1 at equal intervals, windings 3 wound around the respective magnetic poles 2 to form two-phase windings and multiple small teeth 4 provided at the tip end of each magnetic pole 2, and a rotor 9 having two splitted rotor elements 7, a permanent magnet 8 held therebetween and magnetized to two polarities of N and S in an axial direction, and multiple small teeth 6 formed on an outer periphery of each of the rotor element 7 at an regular pitch, said rotor elements 7 being shifted from each other in angular position by a ½ pitch of the teeth 6. The two-phase hybrid type stepping motor rotatably supports the rotor 9, the rotor 9 being opposed to the stator 5 with a gap therebetween.

The windings 2 are wound on the both sides of N and S polarities and connected so as to constitute two phases A and B with odd numbers and even numbers. As to magnetic flux of a magnet, in case of the phase A, for example, magnetic flux of the rotor magnetic pole on the N polarity side flows from the winding poles of N1 and N5 toward the S polarity through the stator 5 and enters the stator 5 from the winding poles of S3 and S7 and the rotor magnetic pole on the S polarity side to return to the magnetic pole 8. Since this magnetic flux does not flow through the magnetic pole of the phase B, the phase A and the phase B are magnetically independent from each other without mutual interference.

Taking an equivalent circuit of a magnetic circuit of the hybrid type stepping motor shown in FIGS. 1A to 1C into consideration, the equivalent circuit is as shown in FIG. 2 when the magnetic resistance in a magnet core is ignored for the sake of simplicity. In FIG. 2, reference character $F_i$ (here, i is 1 to 8) denotes magnetomotive force of an i-th winding pole; $P_i$ (here i is 1 to 4), a permeance of the i-th winding pole on the N or S polarity side; and $F_m$ and $P_m$, magnetomotive force and an internal permeance of the magnet. It should be noted that the permeances of the winding poles provided at axisymmetric positions are equal to each other and the same reference character is therefore used. Further, in regard to the winding of the phase A, since the N1 and N5 poles are connected in series in the forward direction while the N3 and N7 poles are connected in series in the backward direction, the magnetomotive force to these poles has the same intensity $F_A$, but only the polarities vary. As a result, as shown in FIG. 2, two circuit groups (sub circuits) having four branches ($P_1$ and $F_A$, $P_2$ and $F_B$, $P_3$ and $-F_A$, and $P_4$ and $-F_B$) are aligned in parallel, and two such circuit groups are aligned in series, thereby equivalently replacing with one sub circuit by the circuit logic. This is shown in FIG. 3.

Here, the total permeance of the winding poles of the stator will be first examined, and the cogging torque having the structure that the small teeth provided at the end of each winding pole have a pitch and a tooth width different from those of small teeth of the magnetic pole of the rotor will be then examined.

Since the torque $\tau$ is given by the angle differentiation of magnetic energy in the equivalent circuit shown in FIG. 3, a general expression of the torque is as indicated by Formula 1.

$$\tau = \frac{N_R}{2} \sum_{i=1}^{M} (F_i - F_0)^2 \frac{dP_i}{d\theta_e} \quad (1)$$

Here, $F_O$ denotes reduction in the magnetomotive force of a gap including excitation; $N_R$, a number of teeth of the rotor; 2S, a number of winding poles (in the drawing, S=4); and $\theta_e$, an electrical angle.

It is to be noted that $F_O$ can be calculated in accordance with Norton's theorem as expressed by Formula 2.

$$F_0 = \frac{\sum_{i=1}^{M} P_i F_i + P_m F_m}{\sum_{i=1}^{M} P_i + P_m} \quad (2)$$

Furthermore, it is determined that each permeance has a phase difference of 90 degrees and is expressed by Fourier series of Formula 3 and Formula 4.

$$P_i = p_0 + \sum_{n=1}^{\infty} p_n \cos n\varsigma_i \quad (3)$$

$$\varsigma_i = \theta_e - (i-1)\frac{\pi}{2} \quad (4)$$

For example, $P_1$ can be expressed by Formula 5.

$$P_1 = p_0 + p_1 \cos \theta_e + p_2 \cos 2\theta_e + p_3 \cos 3\theta_e + p_4 \cos 4\theta_e + p_5 \cos 5\theta_e \quad (5)$$

In the above-described two-phase hybrid type stepping motor, torque is generated between the rotor and the stator when the rotor is rotated without energizing the windings, and this torque is referred to as cogging torque.

When a plurality of windings in the two-phase hybrid type stepping motor are sequentially energized to rotate the motor, there is generated synthetic torque obtained from torque generated by energizing the windings and the cogging torque as the torque generated in the rotor. Plenty of pulsation is included in the synthetic torque, which leads to; a problem such as large vibration or noise.

Further, although the vernier method for unequalizing a pitch of the small teeth of the stator and that of the small teeth of the rotor was examined in order to reduce the cogging torque of the two-phase hybrid type stepping motor in the prior art, examination is still insufficient and the satisfactory effect is not obtained. Therefore, it is another object of the present invention to elucidate the theory of the vernier method and obtain the effective vernier method having a high degree of freedom.

In order to solve the problems, a state of occurrence of the cogging torque will be first examined. The cogging torque $\tau_c$ corresponds to the case where the magnetomotive force of the windings is zero ($F_A = F_B = 0$) and can be expressed by Formula 6 and Formula 7.

$$\tau_C = \frac{N_R}{2} \left(\frac{P_m F_m}{P_T}\right)^2 \frac{d}{d\theta_e} \sum_{i=1}^{M} P_i \quad (6)$$

$$P_T = \sum_{i=1}^{M} P_i + P_m \qquad (7)$$

Thus, in order to remove the cogging torque, a sum of respective orders of $P_i$ in Formula 6 should be zero.

Table 1 shows the primary to quaternary harmonic contents of the respective Fourier series and a sum of these harmonic contents with i=1 to 4.

TABLE 1

|        | PRIMARY      | SECONDARY     | TERTIARY      | QUATERNARY      |
|--------|--------------|---------------|---------------|-----------------|
| $P_1$  | $\cos(\theta_e)$  | $\cos(2\theta_e)$  | $\cos(3\theta_e)$  | $\cos(4\theta_e)$    |
| $P_2$  | $\sin\theta_e$    | $-\cos 2\theta_e$  | $-\sin 3\theta_e$  | $\cos(4\theta_e)$    |
| $P_3$  | $-\cos\theta_e$   | $\cos 2\theta_e$   | $-\cos 3\theta_e$  | $\cos(4\theta_e)$    |
| $P_4$  | $-\sin\theta_e$   | $-\cos 2\theta_e$  | $\sin 3\theta_e$   | $\cos(4\theta_e)$    |
| $\Sigma P_1$ | 0      | 0             | 0             | $4\cos(4\theta_e)$   |

It is to be noted that the coefficient $\rho_i$ is equal with respect to each polarity, thereby omitting this coefficient.

According to Table 1, in the structure with the eight winding poles, a sum total of $P_i$ which is the contribution of the cogging torque is zero in the tertiary or lower harmonic contents. In general, since the sum total becomes smaller as the order becomes higher, the quaternary harmonic content remains as the maximum affector. That is why the quaternary harmonic content appears in the cogging torque of the two-phase motor.

In order to remove this torque, the quaternary harmonic content of each magnetic pole permeance $P_i$ must be set to zero in each winding pole.

Thus, the permeance of each small tooth provided at the end of the winding pole will be examined, and conditions for setting a sum of the quaternary harmonic contents of the respective permeances to be zero will be then examined in accordance with each small tooth.

A flow of the magnetic flux differs depending on the relationship of the relative position of the respective small teeth of the stator and the rotor. FIG. 4 partially shows this state. Here, 2T denotes a repetition pitch of the rotor small teeth; α, a ratio of the stator small tooth width to the rotor tooth pitch; β, a ratio of the rotor small tooth width to the rotor small tooth pitch; and x, displacement involved by rotation at the center of the stator small teeth and the center of the rotor small teeth. Since detailed illustration in FIG. 4 leads to complication, only the permeance at a flat surface portion (1) to which the both types of the small teeth are opposed is examined with taking into consideration the fact that the gap dimension is extremely small. The permeance is typically calculated by Formula 8.

$$P = \mu_0 \int \frac{dA}{l} \qquad (8)$$

Here, $\mu_0$ designates space permeability; dA, a differential opposed area; and l, a magnetic path length. Consequently, the permeance P per one small tooth of the winding pole can be obtained in the form of Formula 9. Here, t denotes a lamination thickness of the magnetic core; w, an opposition width; $l_g$, an air gap length.

$$P = \frac{\mu_0 w t}{l_g} \qquad (9)$$

Since the permeance P is determined by the opposition width w of the magnetic core, P can be obtained by being aware of the operation of the opposition width of the small teeth of the stator and the small teeth of the rotor when the rotor is rotated. Since the width w linearly varies, it can be understood that the permeance P is as shown in FIGS. 5A and 5B by considering with reference to FIG. 4 showing the structure of the small teeth of the winding poles.

Representation of the permeance such as shown in FIGS. 5A and 5B by the Fourier series will now be considered.

Rendering FIGS. 5A and 5B in the general form, FIG. 6 can be obtained. Here, A and B designate a height of a summit portion and a height of a trough portion; 2 γ, a width of the summit portion; and 2 δ, a width of a base of a summit portion. When such an even function is expressed by the Fourier series, the term of sin is eliminated and the function takes the form of Formula 10 and Formula 11. It is to be noted that an angle θ substitutes for the distance x. Therefore, a cycle 2T=2 π is obtained.

$$f_1(\theta) = \frac{a_0}{2} + \sum_n a_n \cos\theta \qquad (10)$$

$$a_n = \frac{2}{\pi} \int_0^\pi f_1(\theta)\cos n\theta\, d\theta \qquad (11)$$

When the plus angle side in FIG. 6 is represented as a function, it is possible to define with sections being divided as indicated by Formula 12.

$$\begin{aligned}
(1) \quad f_1(\theta) &= A & 0 \le \theta \le \gamma\pi \\
(2) \quad &= A - \frac{A-B}{\delta\pi - \gamma\pi}(\theta - \gamma\pi) & \gamma\pi \le \theta \le \delta\pi \\
(3) \quad &= B & \delta\pi \le \theta \le \pi
\end{aligned} \qquad (12)$$

When γ, δ, A and B in Formula 12 are set right and represented based on the relationship shown in FIGS. 5A and 5B, Table 2 is obtained. It is to be noted that min(α, β) is a function taking a smaller one of α and β.

TABLE 2

| CONDITION | $(\alpha + \beta) \le 1$ | $(\alpha + \beta) \ge 1$ |
|-----------|--------------------------|--------------------------|
| γ         | $|\alpha - \beta|$       | $|\alpha - \beta|$       |
| δ         | $(\alpha + \beta)$       | $(2 - \alpha - \beta)$   |
| A         | $\dfrac{2\mu_0 t \min(\alpha, \beta)}{l_g}$ | $\dfrac{2\mu_0 T \min(\alpha, \beta)}{l_g}$ |
| B         | 0                        | $\dfrac{2\mu_0 t \min(\alpha + \beta - 1)}{l_g}$ |

Taking the indefinite integral formulas 13 and 14 into consideration, when the Fourier coefficient of the Formula 11 is calculated, Formulas 15 to 18 are obtained.

$$\int \cos n\theta = \frac{1}{n} \sin n\theta \quad (13)$$

$$\int \theta \cos \theta = \cos \theta + \theta \sin \theta \quad (14)$$

Section 1 (15)

$$a_{n1} = \frac{2}{\pi} \int_0^{\gamma\pi} A\cos n\theta d\theta = \frac{2A}{n\pi}[\sin n\theta]_0^{\gamma\pi}$$

$$= \frac{2A}{n\pi}\sin n\gamma\pi$$

Section 2 (16)

$$a_{n2} = \frac{2}{\pi} \int_{\delta\pi}^{\gamma\pi} (A + K\gamma\pi - K\theta)\cos n\theta d\theta$$

$$= \frac{2(A + K\gamma\pi)}{n\pi}[\sin n\theta]_{\gamma\pi}^{\delta\pi} -$$

$$\frac{2K}{n^2\pi}[\cos n\theta + n\theta\sin n\theta]_{\gamma\pi}^{\delta\pi}$$

$$= \frac{2(A + K\gamma\pi)}{n\pi}(\sin n\delta\pi - \sin n\gamma\pi) -$$

$$\frac{2K}{n^2\pi}(\cos n\delta\pi - \cos n\gamma\pi) -$$

$$\frac{2K}{n}(\delta\sin n\delta\pi - \gamma\sin n\gamma\pi)$$

$$K = \frac{A - B}{\delta\pi - \gamma\pi} \quad (17)$$

$$a_{n3} = \frac{2}{\pi}\int_{\delta\pi}^{\pi} B\cos n\theta dx = \frac{2B}{n\pi}[\sin n\theta]_{\delta\pi}^{\pi} \quad (18)$$

$$= -\frac{2B}{n\pi}\sin n\delta\pi$$

A sum of Formulas 15 to 17 is the Fourier coeffcient of a permeance variation $f_i$ (θ) of one small tooth and can be expressed as Formula 19.

$$a_n = \sum_{j=1}^{3} a_{nj} \quad (19)$$

The main torque may be totalized with n=1, and the cogging torque may be totalized with n=4. In general, since (α+β)≦1, Formula 18 becomes 0, and Formula 15 and Formula 17 are the main constituents of the Fourier coefficient. It is, however, apparent that values of the formulas can be determined by the tooth width ratios α and β except the lamination thickness t and the rotor tooth pitch 2T.

To sum up, (1) the permeance of the small teeth is determined by the tooth width ratios of the rotor and the stator. (It is important that the coefficient varies depending on the tooth width.)

(2) Since even the shortened calculation results in a complicated formula, it is difficult to realize $\Sigma P_i$=0 by correctly balancing the entire small teeth.

It can be, therefore, considered that there are multiple small teeth for each winding pole and pairs of two teeth are balanced (a variation in permeance is set to 0).

In good order, the case of the regular pitch vernier will be first examined. The quaternary harmonic content of the permeance for one small tooth can be expressed by Formula 20.

$$P_4 = \alpha_4 \cos 4\theta \quad (20)$$

Assuming that the small teeth of the winding pole are arranged as shown in FIG. 7, Formula 21 should be attained in order to set the quaternary harmonic content to 0. Here, $\theta_k$ denotes a position of each small tooth (electrical angle).

$$P_4 = \sum_{k=1}^{6} \alpha_4 \cos 4\theta_k = 0 \quad (21)$$

In case of the conventional regular pitch vernier, the small teeth $t_k$ are distributed with the equal tooth width and at equal intervals. Meanwhile, in case of the irregular pitch vernier, they are distributed with the unequal tooth width and at unequal intervals. FIG. 8A shows an angle arrangement of the quaternary harmonic content of the regular pitch vernier.

In this case, each vector $V_k$ can be distributed by dividing 360 degrees into six sections (360/6=60). At this time, since every vector has another vector at the axisymmetric position, such a pair of vectors are canceled out each other. Rotation of each vector while maintaining this relational position can constantly strike a balance during rotation, thereby achieving Formula 22. Here, m is an integer including 0.

$$\theta_k = m\frac{2\pi}{4p} + k\frac{2\pi}{6}\frac{1}{4p} \quad k = 0, 1, \ldots, 5 \quad (22)$$

When a number of pole pairs of teeth provided to the rotor is 50 for example, the electrical angle 360 degrees in the first term corresponds to 7.2 degrees, and distribution can be made every 0.3 degree as the second term based on this electrical angle.

0.3 degree is used for calculation to obtain 0.3×50×4=60, and the opposed position becomes 60×3=180 degrees. In case of the regular pitch vernier, although the equal tooth width is usually used, all the tooth widths do not have to be the same if the widths of the opposed teeth are equal.

The case of the irregular pitch vernier will now be examined. FIG. 8B shows an example of the vector relation between the respective small teeth in case of the irregular pitch where the arrangement pitch for the small teeth is not the regular pitch. In FIG. 8B, when a balance is struck between two corresponding vectors, i.e., $V_1$ and $V_4$, $V_2$ and $V_5$, and $V_3$ and $V_6$, $P_4$=0 is attained on the whole and the cogging torque also becomes 0, which can be expressed by Formula 23. Here, Q denotes a number of small teeth of one winding pole.

$$\sum_{k=1}^{Q} P_{4K} = 0 \quad (23)$$

If such a relationship as that vectors in each pair of vectors are canceled out each other (balance condition) is satisfied, arrangement of each pair of vectors may be arbitrary. This is the principle of zeroization of the cogging torque. Although there are various kinds of corresponding relationships of the vectors to be balanced, the following three types can be typically considered.

Assuming that the small teeth of the winding pole are arranged as shown in FIG. 7, (1) Formula 24 can be obtained between the adjacent small teeth.

$$\theta_{2k} - \theta_{2k-1} = \frac{1}{4p}(2m\pi + \pi) \quad k = 1 \cdot 2 \cdot 3 \quad (24)$$

(2) Formula 25 can be obtained between the diagonal small teeth.

$$\theta_{k+3} - \theta_k = \frac{1}{4p}(2m\pi + \pi) \quad k = 1 \cdot 2 \cdot 3 \tag{25}$$

(3) Formula 26 can be obtained between the small teeth at symmetrical positions with the central axis therebetween.

$$\theta_{S-k+1} - \theta_k = \frac{1}{4p}(2m\pi + \pi) \quad k = 1 \cdot 2 \cdot 3 \tag{26}$$

Since $2m\pi$ means that the same pitch angle is used as that of the small teeth of the rotor, rewriting the above formulas by using a deviation angle $\delta\theta$ from the reference position eventually results in Formulas 27 to 29.

$$\varepsilon = |\delta\theta_{2k} - \delta\theta_{2k-1}| = \frac{\pi}{4p} \quad k = 1 \cdot 2 \cdot 3 \tag{27}$$

$$\varepsilon = |\delta\theta_{k+3} - \delta\theta_k| = \frac{\pi}{4p} \quad k = 1 \cdot 2 \cdot 3 \tag{28}$$

$$\varepsilon = |\delta\theta_{S-k+1} - \delta\theta_k| = \frac{\pi}{4p} \quad k = 1 \cdot 2 \cdot 3 \tag{29}$$

The right side has 0.9 degree, and the electrical angle of the quaternary harmonic space is 180 degrees when a number p of small teeth of the rotor=50.

By setting right the method for eliminating the cogging torque of the irregular pitch vernier according to this system, the following respects can be obtained.

(1) When a number of small teeth of the rotor is p, the following formula should be achieved.

(a) Formula 30 is obtained with respect to a difference angle $\epsilon$ between the respective adjacent small teeth, i.e., $t_1$ and $t_2$, $t_3$ and $t_4$, and $t_5$ and $t_6$.

$$\varepsilon = |\delta\theta_{2k} - \delta\theta_{2k-1}| = \frac{45°}{p}(\text{machine angle}) \quad k = 1 \cdot 2 \cdot 3 \tag{30}$$

(50 teeth 0.9°)

(b) Formula 31 can be obtained with respect to angle pairs of $t_1$ and $t_4$, $t_2$ and $t_5$, and $t_3$ and $t_6$.

$$\varepsilon = |\delta\theta_{k+3} - \delta\theta_k| = \frac{45°}{p}(\text{machine angle}) \quad k = 1 \cdot 2 \cdot 3 \tag{31}$$

(50 teeth 0.9°)

(c) Formula 32 can be obtained with respect to angle axisymmetric pairs of $t_1$ and $t_6$, $t_2$ and $t_5$, and $t_3$ and $t_4$.

$$\varepsilon = |\delta\theta_{S-k+1} - \delta\theta_k| = \frac{45°}{p}(\text{machine angle}) \quad k = 1 \cdot 2 \cdot 3 \tag{32}$$

(50 teeth 0.9°)

(2) The widths of the respective small teeth are set to be equal.

To sum up, when a number of small teeth provided at the end of the stator magnetic pole is an even number, the small teeth are divided into arbitrary pairs of two small teeth having the same tooth width, and arranged in such a manner that a sum of the quaternary harmonic vectors of the permeances of the two small teeth in each pair becomes zero.

The above examination has targeted on the case where a number of the small teeth provided to the winding pole is an even number. Examining the case where a number of small teeth is an odd number as shown in FIG. 9, when pairs of small teeth are used to strike a balance in the arrangement of the two small teeth, one fraction is generated in case of the odd number, which produces the inconvenience. Therefore, one small tooth as a fraction must be combined with an arbitrary pair of the small teeth to strike a balance. In case of five small teeth, when two small teeth and three small teeth are used for balancing, the vector relationship between them is as shown in FIG. 10. Here, a balance is struck between three vectors $V_1$, $V_3$ and $V_5$ and between two vectors $V_2$ and $V_4$, respectively. In this case, the relationship is such that a balance is struck by the angles $\delta\theta_1$, $\delta\theta_3$, $\delta\theta_5$ and the angles $\delta\theta_2$ and $\delta\theta_4$.

FIG. 3 shows a result of checking how the motor in a practical application is based on the above-described theory. A, B and C denote motors which have put into practical use, wherein the motor C has a regular pitch. Trial calculations 1, 2 and 3 are examples of trial calculations based on the above theory. It is to be noted that a unit is a machine angle °.

TABLE 3

| TYPE OF MACHINE | | | MOTOR A | | MOTOR B | | MOTOR C | | TRIAL CALCULATION 1 | | TRIAL CALCULATION 2 | | TRIAL CALCULATION 3 | |
|---|---|---|---|---|---|---|---|---|---|---|---|---|---|---|
| SMALL TOOTH | | REFERENCE ANGLE | $\delta\theta$ | TOOTH WIDTH | $\delta\theta$ | TOOTH WIDTH | $\delta\theta$ | TOOTH WIDTH | $\delta\theta$ | TOOTH WIDTH | $\delta\theta$ | TOOTH WIDTH | $\delta\theta$ | TOOTH WIDTH |
| $t_1$ | | −18.0 | +0.45 | 0.9 | +0.55 | 0.69 | +0.75 | 0.83 | +0.65 | 0.83 | +0.45 | 0.83 | +0.45 | 0.83 |
| $t_2$ | | −10.8 | +0.63 | 0.84 | −0.45 | 0.82 | +0.45 | 0.83 | +0.45 | 0.83 | +0.45 | 0.83 | −0.45 | 0.83 |
| $t_3$ | | −3.6 | +0.27 | 0.82 | −0.35 | 0.88 | +0.15 | 0.83 | +0.25 | 0.83 | +0.45 | 0.83 | +0.45 | 0.83 |
| $t_4$ | | +3.6 | −0.27 | 0.82 | +0.35 | 0.88 | −0.15 | 0.83 | −0.25 | 0.83 | −0.45 | 0.83 | −0.45 | 0.83 |
| $t_5$ | | +10.8 | −0.63 | 0.84 | +0.45 | 0.82 | −0.45 | 0.83 | −0.45 | 0.83 | −0.45 | 0.83 | +0.45 | 0.83 |
| $t_6$ | | +18.0 | −0.45 | 0.9 | −0.55 | 0.69 | −0.75 | 0.83 | −0.65 | 0.83 | −0.45 | 0.83 | −0.45 | 0.83 |
| BALANCE | ADJACENT POLE | (0.9) | | | | | | | | | | | ○ | |
| | DIAGONAL POLE | (0.9) | | | | | ○ | | ○ | | ○ | | ○ | |
| | SYMMETEIC POLE | (0.9) | | | | | | | | | ○ | | ○ | |
| AXISYMMETRIC PROPERTY | | | ○ | | ○ | | ○ | | ○ | | ○ | | ○ | |

In Table 3, circles represent evaluation of the balance. The example of the trial calculation 3 satisfies three types of arrangement condition; the trial calculation 2, two types of arrangement condition; the trial calculation 1 and the motor C, one type of arrangement condition. When they are represented by vectors of the quaternary harmonic electrical angle space, FIGS. 11A to 11C can be obtained. In FIGS. 11A and 11B, since there is a difference in largeness between opposed vectors, it is apparent that they are not canceled out and the quaternary harmonic content remains. In case of the trial calculation examples 2 and 3, all the vectors are concentrated in the directions $V_2$ and $V_5$ as shown in FIG. 11C. As compared with the regular pitch vernier (FIG. 8A), since the degree of freedom of the angle arrangement is high according to this technique, there is such an advantage as that the angle can be set in detail while taking influences to other harmonic waves into consideration.

Further, a technique for eliminating both the tertiary harmonic wave and the quaternary harmonic wave will now be examined. The windings of the phase A in the two-phase motor form a circuit in which windings wound around the first and third magnetic poles are connected in series in the reverse polarity. Similarly the windings of the phase B form a reverse series circuit having the windings wound around the second and fourth magnetic poles. Therefore, the effect of the both windings is added by the differential in the phase A, and the effect is similarly added by the differential in the phase B, thereby producing a flux interlinkage. Paying notice to the relationship of the Fourier coefficient of each harmonic wave in Table 1, it can be understood that the even-numbered order harmonic waves are canceled out each other in case of the differential but the odd-numbered order harmonic waves are added. Although the primary harmonic wave generates an induced voltage corresponding to the main torque having sine waves, the tertiary harmonic wave must be eliminated since it results in unnecessary distortion. A method for minimizing the tertiary harmonic wave while balancing the quaternary harmonic wave will be examined hereinafter.

FIGS. 8A and 11B show vector diagrams in the quaternary harmonic space illustrating the arrangement of the small teeth in the regular pitch vernier system and the irregular pitch vernier system according to the prior art. FIGS. 12 and 13 show these vector diagrams in terms of the tertiary harmonic wave plane.

In FIG. 12, the vectors $V_1$ and $V_4$, $V_2$ and $V_5$, and $V_3$ and $V_6$ respectively have the angle equal to ¾ of 180 degrees= 135 degrees. When a number of the small teeth of the winding pole is six, there are three pairs of vectors which have the relationship of 180 degrees in the quaternary harmonic space. Two vectors separated from each other by 180 degrees in the quaternary harmonic space become two vectors separated from each other by 135 degrees in the tertiary harmonic space. In order to balance these three pairs in the quaternary harmonic space, the respective synthetic vectors must be separated from each other by 120 degrees so that a sum of the overall vectors becomes zero.

By setting right the above conditions, the following respects can be obtained.

(1) A difference angle E between the small teeth in each pair is 45°/p (0.9° in case of 50 teeth) expressed by Formulas 30 to 32.

(2) A center angle of a pair of the vectors is γ=40°/p (0.8° in case of 50 teeth).

As a solution of the above conditions, FIG. 14 can be considered. This is the case where deviations from three vectors (dotted lines) balanced on the tertiary harmonic wave plane are +4.5° and −4.5° in terms of a machine angle. Trial calculation example is shown in Table 4. FIG. 15 shows the shape of the small teeth in this case.

When the deviation becomes large beyond a reference angle, the basic wave component contributing to the torque is reduced, and hence there can be considered reduction in a difference of the deviation angle to some measure by sacrificing the tertiary harmonic wave distortion. Table 4 also shows the trial calculation examples by taking this into consideration.

TABLE 4

| SMALL TOOTH | REFERENCE ANGLE | TRIAL CALCULATION 4 | | TRIAL CALCULATION 5 | | TRIAL CALCULATION 6 | |
| --- | --- | --- | --- | --- | --- | --- | --- |
| | | DEVIATION ANGLE | TOOTH WIDTH | DEVIATION ANGLE | TOOTH WIDTH | DEVIATION ANGLE | TOOTH WIDTH |
| $t_1$ | −18.0 | +1.25 | 0.84 | +0.9 | 0.85 | +1.15 | 0.85 |
| $t_2$ | −10.8 | +0.35 | .084 | 0 | 0.85 | +0.25 | 0.85 |
| $t_3$ | −3.6 | +0.45 | .084 | +0.45 | 0.7 | +0.45 | 0.7 |
| $t_4$ | +3.6 | −0.45 | 0.84 | −0.45 | 0.7 | −0.45 | 0.7 |
| $t_5$ | +10.8 | −0.35 | 0.84 | 0 | 0.85 | −0.25 | 0.85 |
| $t_6$ | +18.0 | −1.25 | 0.84 | −0.9 | 0.85 | −1.15 | 0.85 |
| BALANCE | QUATERNARY | ○ | | ○ | | ○ | |
| | TERTIARY | ○ | | | | △ | |

Further, in cases where a number of the small teeth of one winding pole is an odd number, by arranging the small tooth group in such a manner that respective synthetic vectors of a group of three small teeth and a group of two small teeth, which are balanced in the quaternary harmonic space, are balanced in the tertiary harmonic space, it is possible to attain both mninimization of the cogging torque and that of distortion of the main torque at the same time.

In Table 4, a circle represents that the balance is excellent and a triangle represents that the balance is the next-best. FIGS. 16A and 16B show the vectors in the trial calculation example 6 and the arrangement of the small teeth.

FIGS. 17A and 17B show the vector balances in the tertiary harmonic space and the quaternary harmonic space when a number of the small teeth is seven (odd number). FIG. 17C shows the arrangement of the small teeth. Here, the vectors $V_1$ and $V_3$, and $V_5$ and $V_7$ form groups and the vectors $V_2$, $V_4$ and $V_6$ form another group. Further, in each group, balancing of vectors in the quaternary harmonic space is performed, and between the synthetic vectors $V_{13}$, $V_{57}$ and $V_{246}$ for the respective groups, balancing of vectors in the tertiary harmonic space is performed. Incidentally, since the width of $t_4$ is set large, a subtle change is produced in the angle of each vector.

As a result of the above-described examination, it was found that the irregular pitch vernier system is effective for reducing the cogging torque of the two-phase stepping motor. Its means for realizing this reduction is as follows.

(1) The intensity of the quaternary harmonic wave of the permeance is affected by the width of the small tooth.

(2) As a new irregular pitch vernier system, the method for balancing in groups of two small teeth or those of three small teeth has a large degree of freedom.

The method for eliminating the quaternary harmonic content of each magnetic pole permeance $P_i$ by the arrangement of the small teeth provided to the winding pole will now be examined.

It can be considered that the permeance $P_i$ of the winding pole is attained by a sum of permeances $P_{ik}$ (i: the number of the winding pole, k: the number of the small tooth) of the constituent small teeth. Here, assuming that a number of the small teeth of the winding pole is Q, Formula 33 can be achieved.

$$P_i = \sum_{k=1}^{Q} P_{ik} \qquad (33)$$

In this examination, therefore, the permeance is calculated in accordance with each small tooth, and the permeance of the winding pole is obtained by a sum of the calculated permeances.

The assumed magnetic path method is adopted for calculation of the permeance, and an example of the magnetic path of one small tooth portion is as shown in FIG. 18. In FIG. 18, 2T denotes a small tooth pitch (magnetic pole pair pitch) of the rotor; α and β, ratios relative to the magnetic pole pitch of the small tooth width of the stator and of the rotor; x, rotational displacement; and ①, ②, ..., division in accordance with a type of the magnetic path. Since processing these magnetic paths in detail results in complexity, the fact that the air gap dimension is extremely small is taken into consideration, and only the permeance between the opposed flat surface portions ① is exemplified for the sake of simplicity and others are omitted.

The permeance $P_{11}$ between the flat surfaces can be calculated by Formula 34.

$$P_{11} = \frac{\mu_0 w t}{l_g} \qquad (34)$$

Here, $\mu_0$ designates the space permeability; w, an opposition width; t, a lamination thickness of the magnetic core; and $l_g$, an air gap length. Since $P_{11}$ is determined by the opposition width w, consideration with reference to FIG. 18 leads to FIG. 6.

In order to examine the arrangement of the small teeth, the hybrid type stepping motor shown in FIG. 1A having 50 teeth of the rotor and eight winding poles of the stator is targeted and an example where the small teeth of one winding pole are aligned in the regular pitch vernier arrangement is first examined. In the regular pitch vernier arrangement, the tooth pitch angle of the rotor is 7.2 degrees and, on the other hand, the small teeth of the stator are aligned at a smaller angle of 6.9 degrees at equal intervals. The quaternary harmonic content of the permeance vector of the small teeth is distributed as shown in FIG. 19.

In FIG. 19, the vector $P_{ikn}$ is represented by $V_k$ for the sake of simplicity. A value in parentheses in the drawing indicates a deviation angle (machine angle) corresponding to $\delta \theta_k$.

Since each harmonic content vector $V_k$ of each small tooth is distributed by dividing the electrical angle 360 degrees equally among six, the sum total becomes zero. Since each vector rotates while maintaining this relationship, balancing is constantly achieved even during rotation, thereby minimizing the cogging torque. This is the principle for reducing the cogging torque according to the regular pitch vernier system which has been conventionally implemented.

Paying notice to the vector arrangement in FIG. 19 in detail, it can be considered that "there are three pairs of the vectors balanced at the axisymmetric positions" or "there are two groups of three vectors balanced at intervals of 120 degrees". That is, if the respective vectors are partially balanced, all of them do not have to be balanced at equal intervals.

This is a basic idea of the irregular pitch arrangement system. In case of six small teeth, two types of arrangement shown in FIG. 20A and FIG. 20B can be considered. In FIG. 20A, three pairs of vectors, i.e., $V_1$ and $V_4$, $V_2$ and $V_5$, and $V_3$ and $V_6$ are balanced at axisymmetric positions. Further, in FIG. 20B, two groups of three vectors, i.e., $V_1$, $V_3$ and $V_5$, and $V_2$, $V_4$ and $V_6$ are balanced at equal intervals of 120 degrees.

In particular, since two vectors form a pair in case of FIG. 20A, the width of the small tooth can be changed in each pair as shown in FIG. 20A.

As described above, the irregular pitch arrangement system has such an advantage as that any respect other than the cogging torque can be taken into consideration because of a higher degree of freedom than the regular pitch arrangement.

The torque generated by an electric current flowing through the winding will now be considered.

In FIG. 3, since the windings of the phase A, i.e., $F_1$ and $F_3$ are connected in series to have the reverse polarity, a difference in the magnetic flux between $P_1$ and $P_3$ is the flux interlinkage. This is also true to the phase B.

Therefore, taking notice of the relationship of the respective harmonic contents in Table 1, it can be found that the even-numbered order harmonic waves of the respective phase are cancelled out but the odd-numbered order harmonic waves are added. Although the primary harmonic wave generates an induced voltage corresponding to the main torque having sine waves, the tertiary harmonic wave can cause distortion and thus this must be removed.

Here, the method for minimizing the tertiary harmonic wave which affects on the waveform distortion of a torque while minimizing the cogging torque by balancing the quaternary harmonic wave will be examined.

When there are six small teeth, there are a method for balancing two vectors as shown in FIG. 20A and a method for balancing three vectors in each group as shown in FIG. 20B. On the tertiary harmonic wave plane, balancing of three vectors in each group and balancing of two vectors in each pair must be achieved in accordance with each other.

Assuming that the vector length is equal in accordance with the small tooth width in FIG. 20A for the sake of simplicity, and the fact that 180 degrees on the quaternary harmonic plane corresponds to 135 degrees on the tertiary harmonic plane is taken into consideration. Then, vectors such as shown in FIGS. 21A and 21B become one solution.

As shown in FIG. 21A, balancing of three vectors in each group, i.e., $V_1$, $V_2$ and $V_4$, and $V_3$, $V_5$ and $V_6$ is achieved on the tertiary harmonic plane. Furthermore, as shown in FIG. 21B, balancing of two vectors in three pairs, i.e., $V_1$ and $V_3$, $V_2$ and $V_5$, and $V_4$ and $V_6$ is attained on the quaternary harmonic plane.

Moreover, methods for achieving both balancing of two vectors in each pair on the tertiary harmonic plane and balancing of three vectors in each group on the quaternary harmonic plane are shown in FIGS. 22A and 22B. As depicted in FIG. 22A, balancing of two vectors in each pair, i.e., $V_1$ and $V_3$, $V_2$ and $V_5$, and $V_4$ and $V_6$ is attained on the tertiary harmonic plane. Additionally, as shown in FIG. 22B, three vectors in each group, i.e., $V_1$, $V_2$ and $V_4$, and $V_3$, $V_5$ and $V_6$ are balanced on the quaternary harmonic plane.

SUMMARY OF THE INVENTION

An object of the present invention is to solve the above problems.

Another object of the present invention to obtain a two-phase hybrid type stepping motor having the structure capable of minimizing the cogging torque and reducing distortion of torque waveforms generated by energizing the windings.

The permeance between the small teeth provided on the stator magnetic pole and the rotor magnetic pole may be varied regularly according to the rotation of the rotor.

Accordingly, the above object can be solved by dividing small stator teeth provided on the tip end of each stator magnetic pole into sets of two or three small stator teeth and arranging so that the vector sum of the quaternary harmonics of permeance in each set is substantially zero.

According to an aspect of the present invention, the above object is attained by a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an even number of and at least four small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero.

Another object of the present invention is to provide a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an odd number of and at least five small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of a set of three small stator teeth including a small teeth positioned at the center of the stator pole and sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero.

Further object of the present invention is to provide a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an even number of and at least four small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth-are composed of sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero, and that a vector sum of the tertiary harmonics of a synthetic vector of permeances of the sets becomes substantially zero.

A further object of the present invention is to provide a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an odd number of and at least five small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of a set of three small stator teeth and sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero, and that a total sum of synthetic vector of permeances of the sets on the tertiary harmonic space substantially zero.

Yet further object of the present invention is to provide a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phases each wound around each stator pole, each of said stator poles having a multiple number of six small stator teeth at the tip end thereof, said rotor having two spelitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of at least two sets of three small stator teeth, and at least one pitch of the adjacent teeth is different from the other pitch of the other adjacent teeth, so that a vector sum of the tertiary harmonic of permeance of the three small stator teeth included in each of said sets becomes substantially zero, and that a vector sum of permeances of axialsymmetric two small stator teeth on the quaternary harmonic plane of two sets becomes substantially zero.

Still further object of the present invention is to provide a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phases each wound around each stator pole, each of said stator poles having a multiple number of six small stator teeth at the tip end thereof, said rotor having two spelitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of at least three sets of two small stator teeth, and at least one pitch of the adjacent teeth is different from the other pitch of the other adjacent teeth, so that a vector sum of the tertiary harmonic of permeance of the two small stator teeth included in each of said sets becomes substantially zero, and that a vector sum of permeances of three small stator teeth which are separated by 120° from each other on the quaternary harmonic plane of three sets becomes substantially zero.

The other object of the present invention is to provide a two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having a mutiple number of three small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of a plurality of sets of three small stator teeth and at least one pitch of the adjacent teeth is different from the other pitch of the other adjacent teeth, so that a vector sum of the quaternary harmonic of permeance of the three small stator teeth included in each of said sets becomes substantially zero.

These and other objects and features of the present invention will become apparent from the following description in conjunction with the attached drawings.

DESCRIPTION OF THE PREFERRED EMBODIMENTS

Figure 1A:
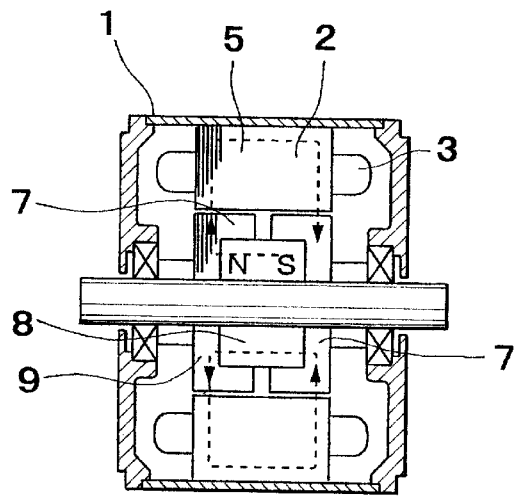
FIG. 1A is a vertically sectional front view of a conventional two-phase hybrid type stepping motor.
Figure 1B:
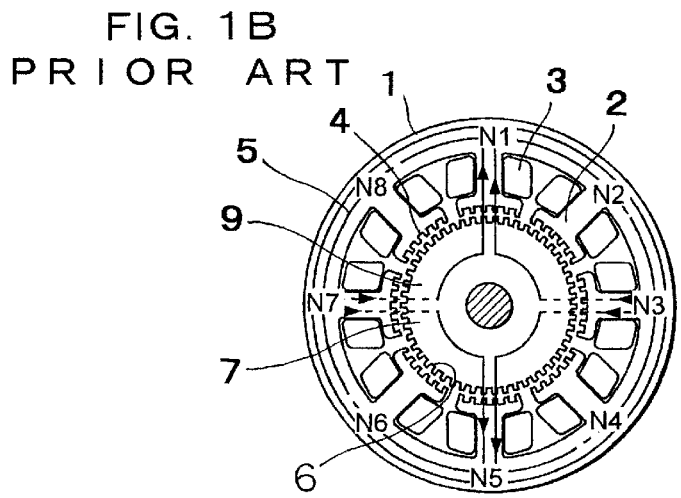
FIG. 1B is a vertically sectional left side (N pole side) view of a conventional two-phase hybrid type stepping motor shown in FIG. 1A.
Figure 1C:
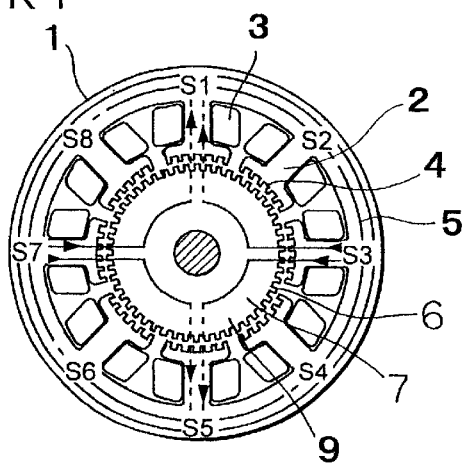
FIG. 1C is a vertically sectional right side (S pole side) view of a conventional two-phase hybrid type stepping motor shown in FIG. 1A.

A first embodiment of the present invention will be explained with reference to the drawings.

The first embodiment of a two-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at an equal pitch on the inner peripheral surface of the annular stator yoke 1, and stator windings 3 of two-phases each wound around each stator pole 2. Each of said stator poles 2 has four small stator teeth 4 at the tip end thereof. Said rotor 9 has two splitted rotor elements 7 and a permanent magnet 8 hold therebetween and magnetized so as to form N and S poles in the axial direction thereof. A plurality of small rotor teeth 6 are formed at a regular pitch on the outer peripheral surface of each of said rotor elements 7, said two splitted rotor elements 7 being shifted from each other in angular position by a ½ pitch of the small rotor teeth 6.

Said small stator teeth 4 are composed of two sets of two small stator teeth 4 of the same width, and at least one pitch of the adjacent teeth 4 is different from the other pitch of the other adjacent teeth 4, so that a vector sum of the quaternary harmonics of permeance of the small stator teeth 4 included in each of said sets becomes substantially zero.

The number of said small stator teeth 4 can be selected as six, eight, ten or twelve instead of four.

A second embodiment of a two-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of two-phase each wound around each stator pole 2. Each of said stator poles 2 has five small stator teeth 4 at the tip end thereof. Said rotor 9 has two splitted rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two splitted rotor elements 7 being shifted from each other in angular position by a ½ pitch of the small rotor teeth 6. Said small stator teeth 4 are composed of a set of three small stator teeth 4 including a small teeth 4 positioned at the center of the stator pole 2 and a set of two small stator teeth 4, and at least one pitch of the adjacent teeth 4 is different from the other pitch of the other adjacent teeth 4, so that a vector sum of the quaternary harmonics of permeance of the small stator teeth 4 included in each of said sets becomes substatntially zero.

The number of said small stator teeth 4 can be selected as seven, nine, eleven or thirteen instead of five.

A third embodiment of a two-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of two-phase each wound around each stator pole 2. Each of said stator poles 2 has four small stator teeth 4 at the tip end thereof. Said rotor 9 has two splitted rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two splitted rotor elements 7 being shifted from each other in angular position by a ½ pitch of the small rotor teeth 6.

Said small stator teeth 4 are composed of two sets of two small stator teeth 4 of the same width, and at least one pitch of the adjacent teeth is different from the other pitch of the other adjacent teeth, so that a vector sum of the quaternary harmonics of permeance of the small stator teeth 4 included in each of said sets becomes substantially zero, and that a vector sum of the tertiary harmonics of permeance of the sets becomes substantially zero.

A fourth embodiment of a two-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of two-phase each wound around each stator pole 2. Each of said stator poles 2 has five small stator teeth 4 at the tip end thereof. Said rotor 9 has two splitted rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two splitted rotor elements 7 being shifted from each other in angular position by a ½ pitch of the small rotor teeth 6.

Said small stator teeth 4 are composed of a set of three small stator teeth 4 of the same width and a set of two small stator teeth 4 of the same width, and at least one pitch of the adjacent teeth 4 is different from the other pitch of the other adjacent teeth 4, so that a vector sum of the quaternary harmonics of permeance of the small stator teeth 4 included in each of said sets becomes substantially zero, and that a vector sum of the tertiary harmonics of permeances of the sets becomes substantially zero.

A fifth embodiment of a two-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of two-phase each wound around each stator pole 2. Each of said stator poles 2 has six small stator teeth 4 at the tip end thereof. Said rotor 9 has two splitted rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two splitted rotor elements being shifted from each other in angular position by a ½ pitch of the small rotor teeth 6.

Said small stator teeth 4 are composed of two sets of three small stator teeth 4, and at least one pitch of the adjacent teeth is different from the other pitch of the other adjacent teeth, so that a vector sum of the tertiary harmonics of permeance of the three small stator teeth included in each of said sets becomes substantially zero, and that a vector sum of permeances of axialsymmetric two small stator teeth on the quaternary harmonic plane of two sets becomes substantially zero.

Figure 20A:
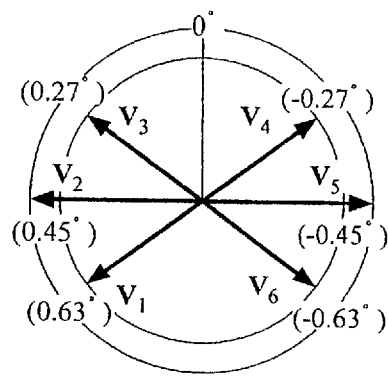
FIG. 20A is an explanation view showing the two vector balance on the quaternary harmonic plane in the system of irregular pitch arrangement.
Figure 20B:
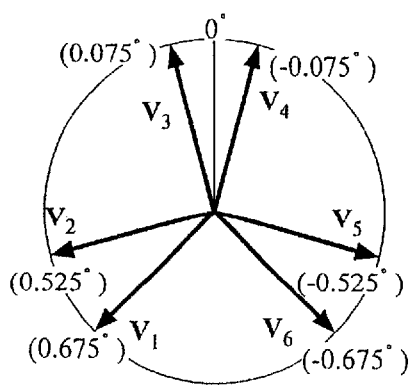
FIG. 20B is an explanation view showing three vector balance on the quaternary harmonic plane in the system of irregular pitch arrangement.

In the five embodiment of the present invention, as shown in FIG. 20A, all vectors $V_1$ to $V_6$ on the tertiary harmonic plane are balanced to one another. That is, the vectors $V_1$, $V_2$ and $V_4$ are separated by 120 degrees from one another and balanced, and the vectors $V_3$, $V_5$ and $V_6$ are separated by 120 degrees from one another and balanced.

Figure 23:
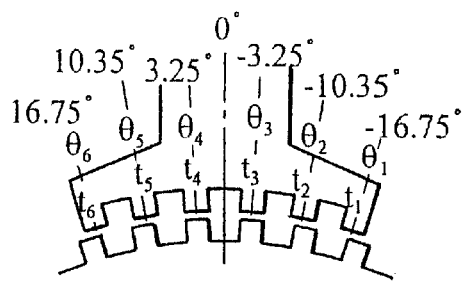
FIG. 23 is an explanation view showing the arrangement of small teeth for realizing the vectors shown in FIG. 21A and FIG. 21B.

The arrangement of the small stator teeth for realizing the valance of the vectors is shown in FIG. 23.

Figure 21A:
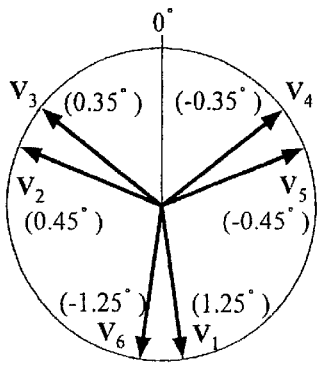
FIG. 21A is an explanation view of vectors at the tertiary harmonic plane of a two-phase hybrid type stepping motor according to the present invention.

In a vector diagram of FIG. 21A, apexes $V_1$, $V_2$, $V_3$, $V_4$, $V_5$ and $V_6$ of the respective vectors indicate positions of the respective small teeth $t_1$, $t_2$, $t_3$, $t_4$, $t_5$ and $t_6$, and each number enclosed with parentheses described beside each character indicates a deviation angle $\delta\theta$ (machine angle) from a reference position.

Therefore, when a position of each small tooth is calculated from a value of this deviation angle, the result is as shown in FIG. 23.

In the arrangement of the small teeth shown in FIG. 23, an interval between $t_1$ and $t_2$ has an angle of 6.4 degrees; an interval between $t_2$ and $t_3$, 7.1 degrees; an interval between $t_3$ and $t_4$, 6.5 degrees; an interval between $t_4$ and $t_5$, 7.1 degrees; and an interval between $t_5$ and $t_6$, 6.4 degrees. In addition, as shown in FIG. 21B, a pair of vectors $V_1$ and $V_3$, a pair of vectors $V_2$ and $V_5$, and a pair of vectors $V_4$ and $V_6$ are respectively placed at the symmetrical positions to be balanced on the quaternary harmonic plane, and they are balanced as a whole.

Figure 21B:
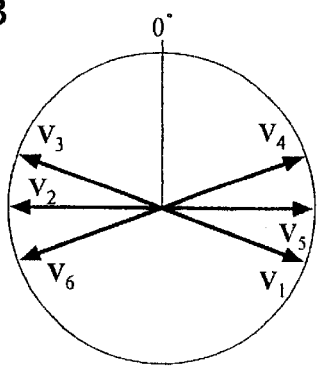
FIG. 21B is an explanation view of vectors on the quaternary harmonic plane of a two-phase hybrid type stepping motor according to the present invention.

Verifying the association between the vectors in FIG. 21A and vectors in FIG. 21B, in order that the vectors $V_1$ and $V_3$ on the quaternary harmonic plane shown in FIG. 21B are placed at the symmetrical positions, i.e., the positions with an interval of 180 degrees, the interval between $V_1$ and $V_3$ of the vectors on the tertiary harmonic plane must have an angle of 135 degrees.

Further, since the relationship between the remaining vectors, i.e., $V_2$ and $V_5$, and $V_4$ and $V_6$ is the same, the interval between two vectors in each pair on the tertiary harmonic plane has 135 degrees.

Figure 22A:
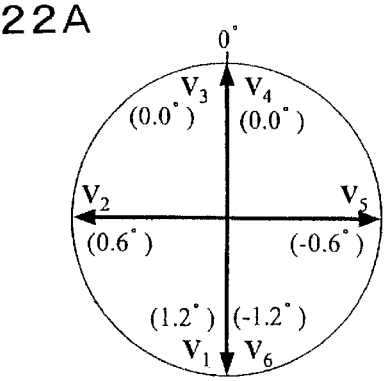
FIG. 22A is an explanation view showing the balance of vectors on the tertiary harmonic plane of a two-phase hybrid type stepping motor according to the present invention.
Figure 22B:
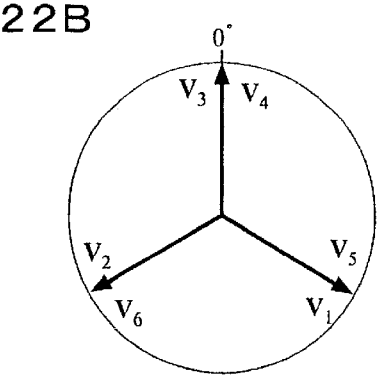
FIG. 22B is an explanation view showing the balance of vectors on the quaternary harmonic plane of a two-phase hybrid type stepping motor according to the present invention.

Therefore, since in the fifth embodiment shown in FIGS. 21A and 22B the vectors of the quaternary harmonic and the tertiary harmonic can be balanced, the cogging torque is reduced and the torque waveform can be improved.

A sixth embodiment of a two-phase hybrid type stepping motor according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of two-phase each wound around each stator pole 2. Each of said stator poles 2 has six small stator teeth 4 at the tip end thereof. Said rotor 9 has two splitted rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two splitted rotor elements being shifted from each other in angular position by a ½ pitch of the small rotor teeth 6.

Said small stator teeth 4 are composed of three sets of two small stator teeth 4, and at least one pitch of the adjacent teeth is different from the other pitch of the other adjacent teeth, so that a vector sum of the tertiary harmonics of permeance of the two small stator teeth included in each of said sets becomes substantially zero, and that a vector sum of permeances of three small teeth in each of sets arranged at intervals of 120 degrees on the quaternary harmonic plane becomes substantially zero.

Figure 24:
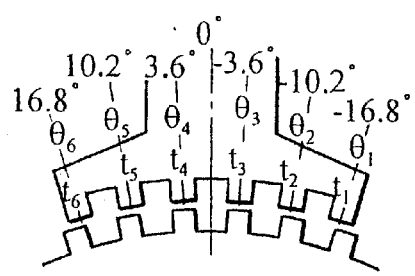
FIG. 24 is an explanation view showing the arrangement of small teeth for realizing the vectors shown in FIG. 22A and FIG. 22B.

FIG. 24 shows the arrangement of the small teeth provided at the end of the winding pole according to the sixth embodiment of the present invention and corresponds to the vector diagrams depicted in FIGS. 22A and 22B.

As to the arrangement of the small teeth shown in the drawing, each interval between $t_1$, $t_2$ and $t_3$ and each interval between $t_4$, $t_5$ and $t_6$ have an angle of 6.6 degrees, and an interval between $t_3$ and $t_4$ has an angle of 7.2 degrees, which is the same as the tooth pitch of the rotor. Therefore, the respective small teeth are symmetrically arranged with 0 degree between $t_3$ and $t_4$ in the center. Verifying the relationship between the arrangement of the small teeth shown in FIG. 24 and the vectors on the tertiary harmonic plane shown in FIG. 22A, an angle of an interval between $t_1$ and $t_3$ is 6.6×2=13.2 degrees, and this becomes 180 degrees in the vector diagram of FIG. 22A. Therefore, balancing is achieved. Similarly, an interval between $t_4$ and $t_6$ has an angle of 13.2 degrees and this angle becomes 180 degrees in the vector diagram in FIG. 22A, thereby achieving balancing. Moreover, an interval between $t_2$ and $t_5$ has an angle of 13.2 degrees and this angle becomes 180 degrees in the vector diagram of FIG. 22A, thus attaining balancing.

In addition, the vectors shown in FIG. 22A indicate balancing of the vectors on the tertiary harmonic plane. However, in the vectors on the quaternary harmonic plane shown in FIG. 22B, groups each consisting of three vectors, i.e., $V_1$, $V_2$ and $V_4$, and $V_3$, $V_5$ and $V_6$ are respectively balanced.

That is, in FIG. 22A, the vectors on the tertiary harmonic plane has such a relationship as that each interval between $V_1$, $V_2$ and $V_4$ has an angle of 90 degrees. On the other hand, since FIG. 22B shows the vectors on the quaternary harmonic plane, the angle between the respective vectors becomes 90×4/3=120 degrees, and each interval between $V_1$, $V_2$ and $V_4$ equally has an angle of 120 degrees in case of the vectors on the tertiary harmonic plane, thereby achieving balancing.

In other words, by arranging six small teeth as shown in FIG. 24, three pairs of tertiary harmonic vectors, i.e., $V_1$ and $V_3$, $V_2$ and $V_5$, and $V_4$ and $V_6$ are arranged at intervals of 180 degrees to be balanced, thereby reducing the tertiary harmonic from the torque waveform. Also, respective groups of three vectors $V_1$, $V_2$ and $V_4$, and $V_3$, $V_5$ and $V_6$ as the quaternary harmonic wave vectors can be balanced at intervals of 120 degrees to reduce the cogging torque.

A seventh embodiment of a two-phase hybrid type stepping motor according to the present according to the present invention comprises a stator 5 and a rotor 9 arranged concentrically with the stator and with an air gap therebetween. Said stator 5 has an annular stator yoke 1, a plurality of stator poles 2 extending radially and formed at a regular pitch on the inner peripheral surface of the annular stator yoke 1, and stator windings 3 of two-phase each wound around each stator pole 2. Each of said stator poles 2 has six small stator teeth 4 at the tip end thereof. Said rotor 9 has two splitted rotor elements 7 and a permanent magnet 8 held therebetween and magnetized so as to form N and S poles in the axial direction thereof. A plurality of small rotor teeth 6 are formed at a regular pitch on the outer peripheral surface of each of said rotor elements 7, said two splitted rotor elements being shifted from each other in angular position by a ½ pitch of the small rotor teeth 6.

Said small stator teeth 4 are composed of two sets of three small stator teeth 4, and at least one pitch of the adjacent teeth is different from the other pitch of the other adjacent teeth, so that a vector sum of the quaternary harmonics of permeance of the three small stator teeth included in each of said sets becomes substantially zero, and that a sum of axialsymmetric two vectors on the tertiary harmonic plane of two sets becomes substantially zero.

Although it was found that the cogging torque can be reduced and the torque waveform can be improved by arranging the small teeth as described above, the advantage will now be verified by the two-dimensional FEM simulation.

Since experimental manufacture of an actual machine according to the above-described various kinds of small teeth arrangement method is difficult, verification is performed by simulation. However, the three-dimensional magnetic field analysis is essentially desirable, but increase in scale of calculation and in time results in difficulty. Therefore, the two-dimensional finite element method is used to perform the approximate analysis. This is the method by which a part corresponding to N1 of the equivalent circuit in FIG. 2 is taken out and the magnetic field analysis is carried out by the two-dimensional FEM to obtain the cogging torque and the flux interlinkage from the result.

Setting right this calculation technique, the following respects can be obtained.

Figure 2:
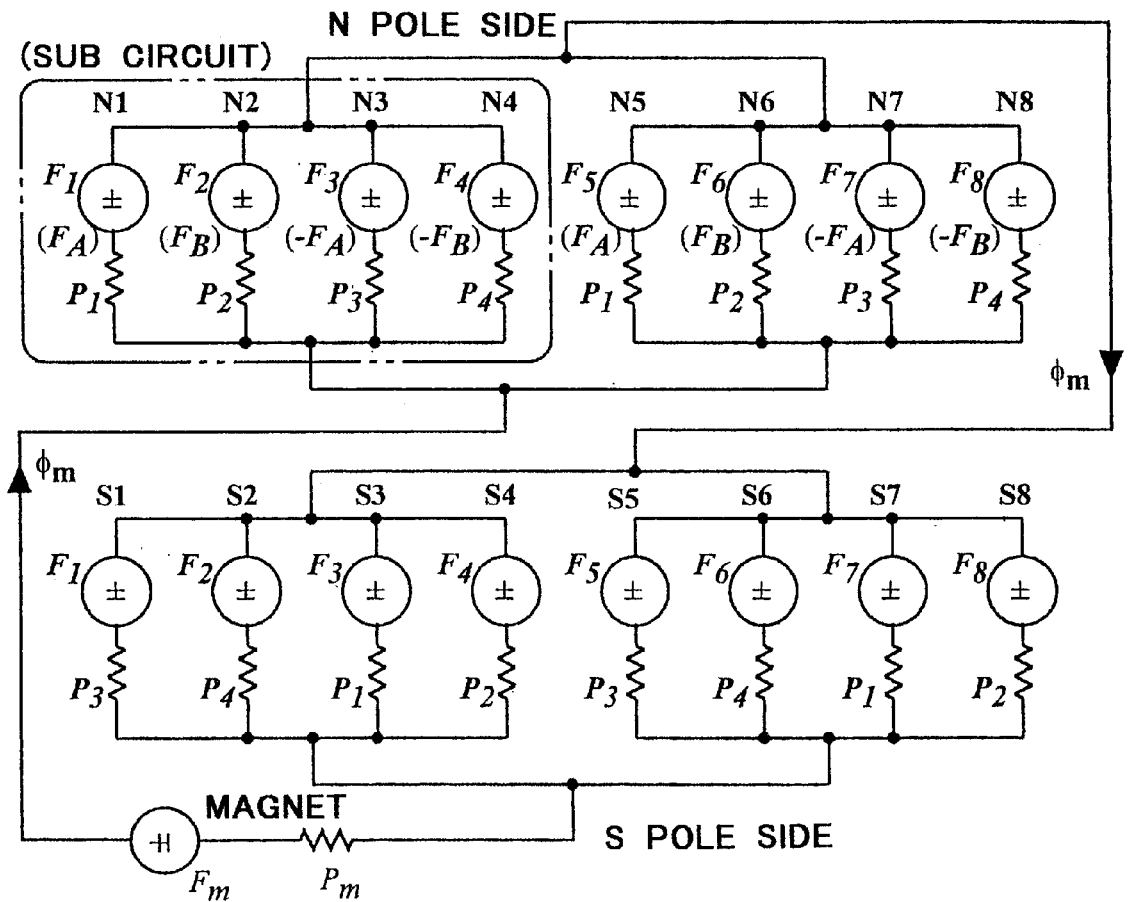
FIG. 2 is an equivalent magnetic circuit diagram of a two-phase hybrid type stepping motor with eight poles having windings.
Figure 3:
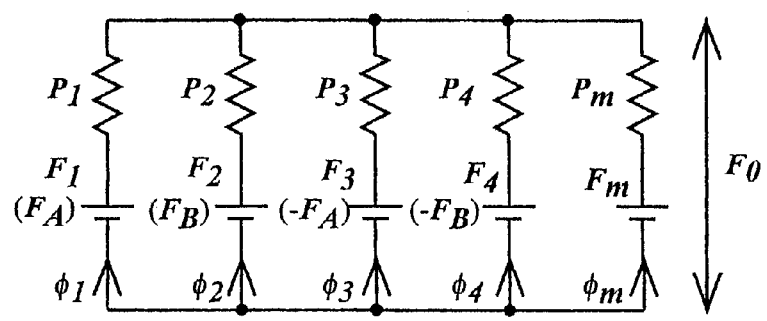
FIG. 3 is an equivalent magnetic circuit diagram showing a circuit of FIG. 2 by one sub circuit.
Figure 4:
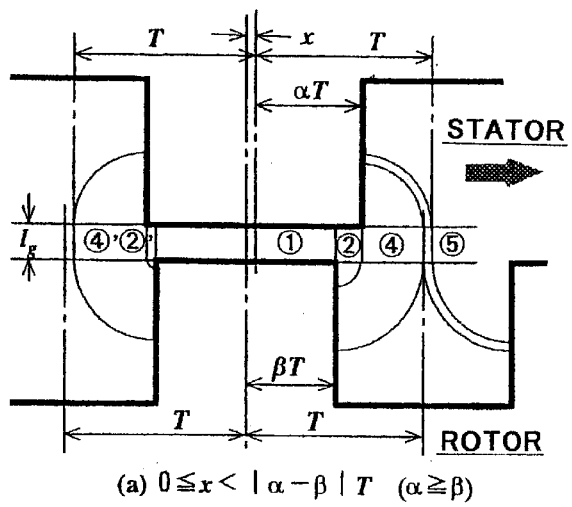
FIG. 4 is an explanation view of imaginary magnetic paths formed between small teeth of a stator and rotor facing each other.
Figure 5A:
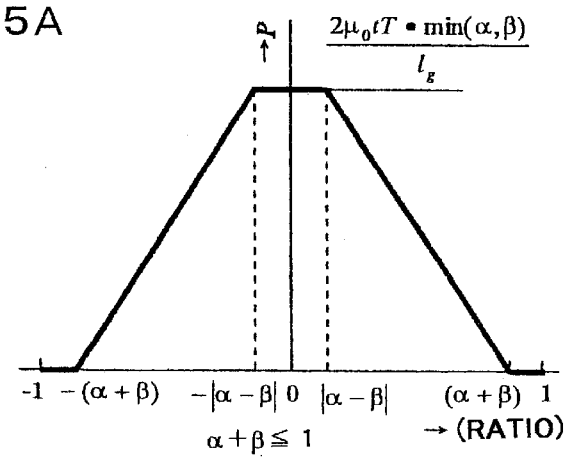
FIG. 5A is an explanation view of the change in permeance between the imaginary magnetic paths of FIG. 4.
Figure 5B:
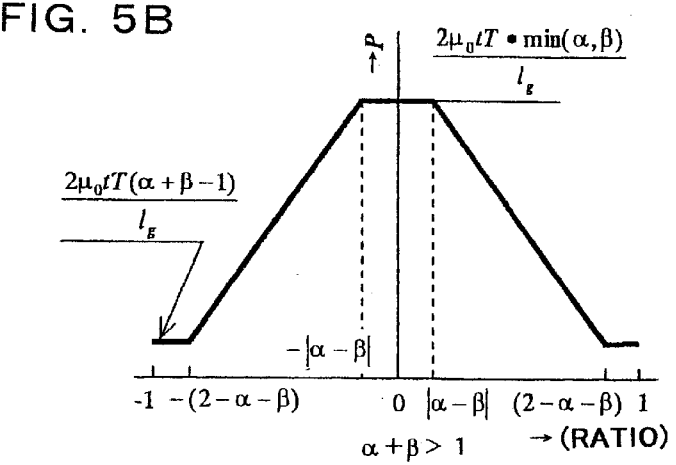
FIG. 5B is an explanation view of the change in permeance between the imaginary magnetic paths of FIG. 4.
Figure 6:
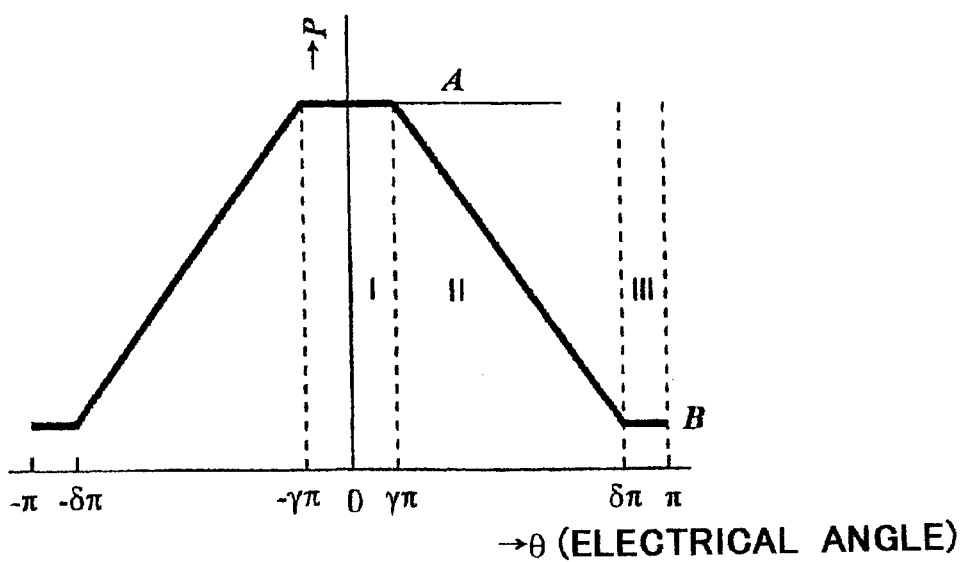
FIG. 6 is an explanation view of the change of general form permeance shown in FIG. 5A and FIG. 5B.
Figure 7:
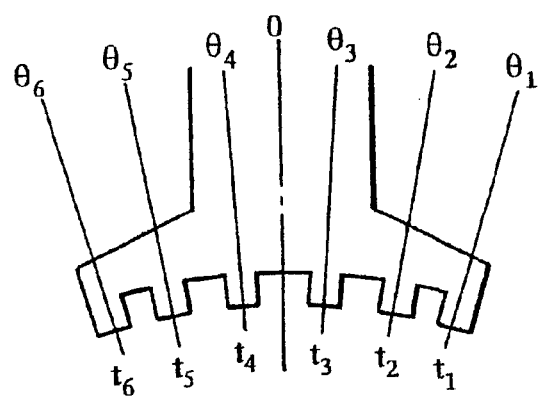
FIG. 7 is an explanation view of the arrangement of small teeth of a magnetic pole having windings.
Figure 8A:
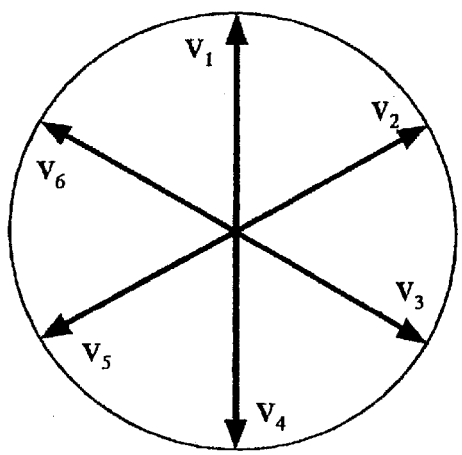
FIG. 8A is an explanation view of vectors showing the valance of permeance vectors about an regular pitch vernier at the quaternary harmonic electrical angle plane.
Figure 8B:
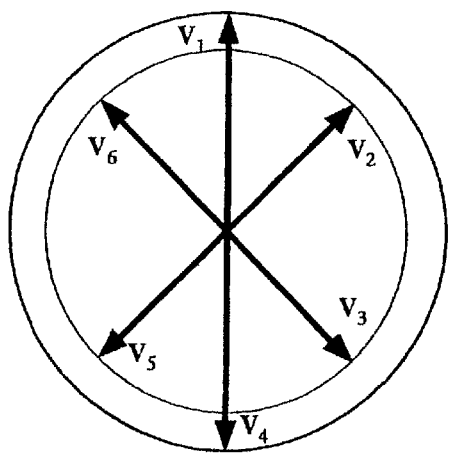
FIG. 8B is an explanation view of vectors showing the valance of the permeance vectors about the irregular pitch vernier on the quaternary harmonic electrical angle plane.
Figure 9:
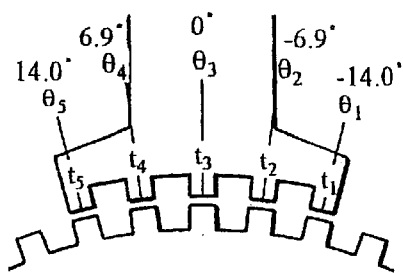
FIG. 9 is an explanation view showing an example of the arrangement of small teeth in case that the number of the small teeth is five.
Figure 10:
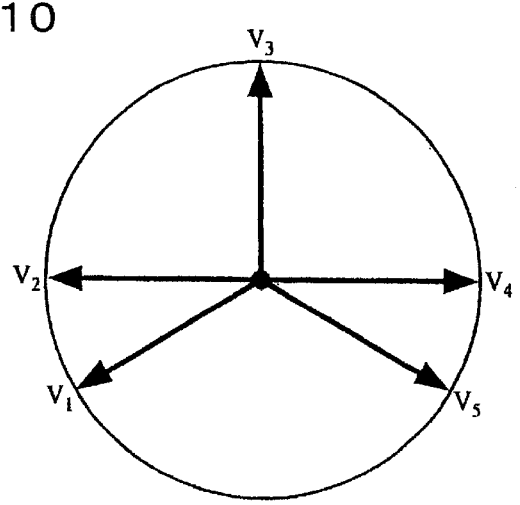
FIG. 10 is an explanation view showing the valance of the permeance vectors in case that the number of the small teeth is an odd number.
Figure 11A:
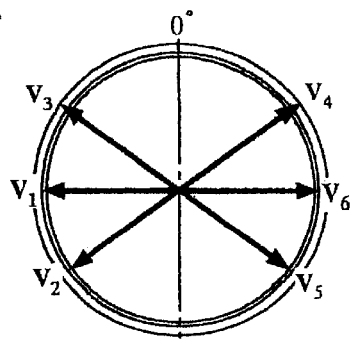
FIG. 11A is an explanation view showing an example of the arrangement of the irregular pitch vernier on the quaternary harmonic electrical angle plane of a motor A.
Figure 11B:
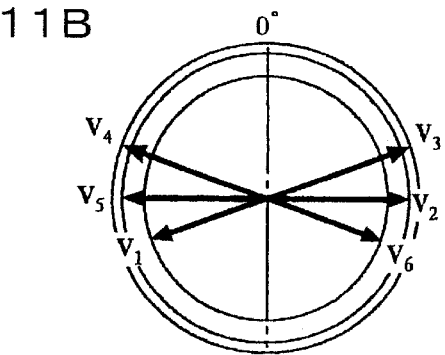
FIG. 11B is an explanation view showing an example of the arrangement of irregular pitch vernier on the quaternary harmonic electrical angle plane of a motor B.
Figure 11C:
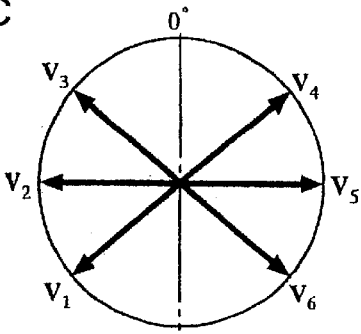
FIG. 11C is an explanation view showing an example of the arrangement of the regular pitch vernier on the quaternary harmonic electrical angle plane of a test example 1.
Figure 12:
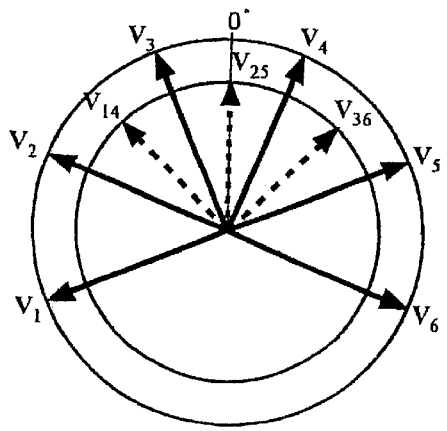
FIG. 12 is an explanation view of the tertiary harmonic vectors at the regular pitch vernier.
Figure 13:
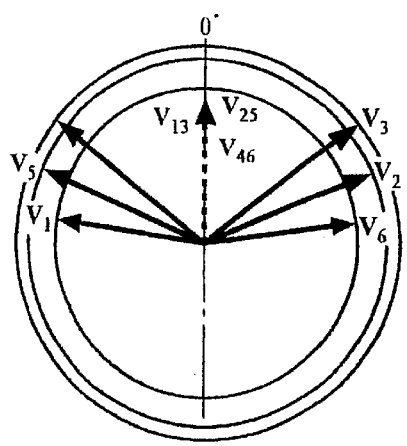
FIG. 13 is an explanation view of the tertiary harmonic vectors at the irregular pitch vernier.
Figure 14:
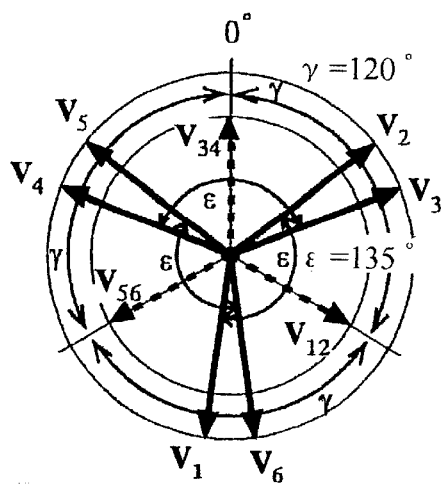
FIG. 14 is an explanation view of vectors showing the valance state in the tertiary harmonic space.
Figure 15:
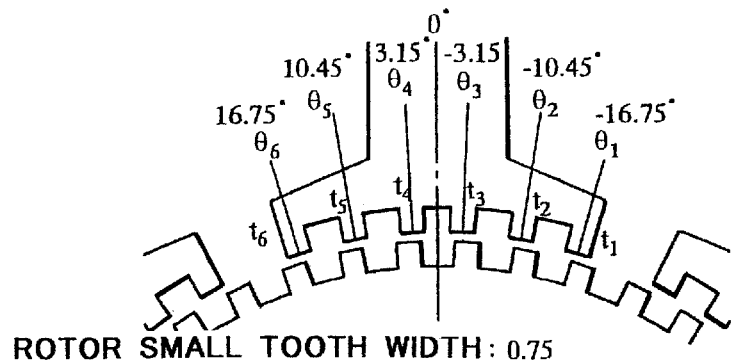
FIG. 15 is an explanation view of the arrangement of small teeth for balancing the tertiary harmonic and quaternary harmonic.
Figure 16A:
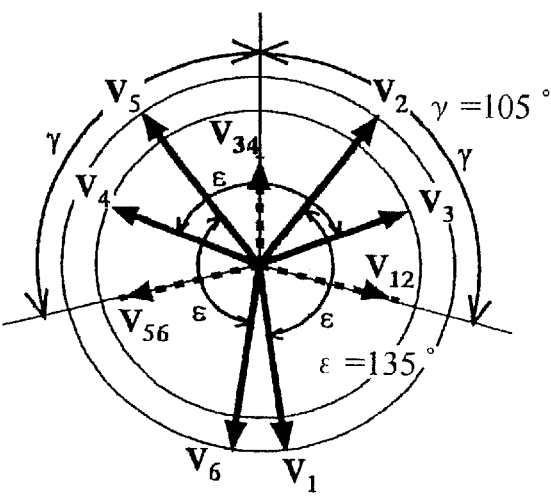
FIG. 16A is an explanation view showing angular relation of each vector on the tertiary harmonic plane of a test example 3.
Figure 16B:
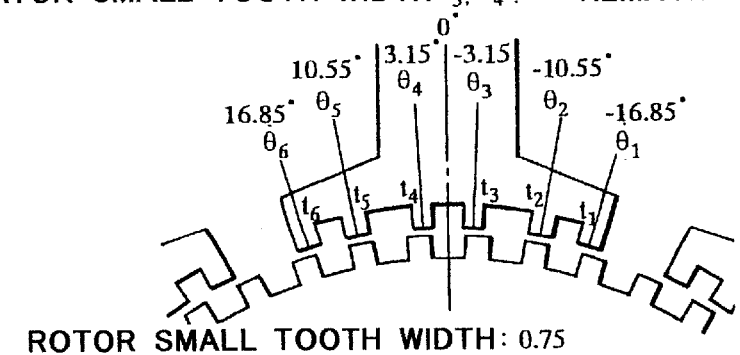
FIG. 16B is an explanation view showing the arrangement of small teeth of the test example 3.
Figure 17A:
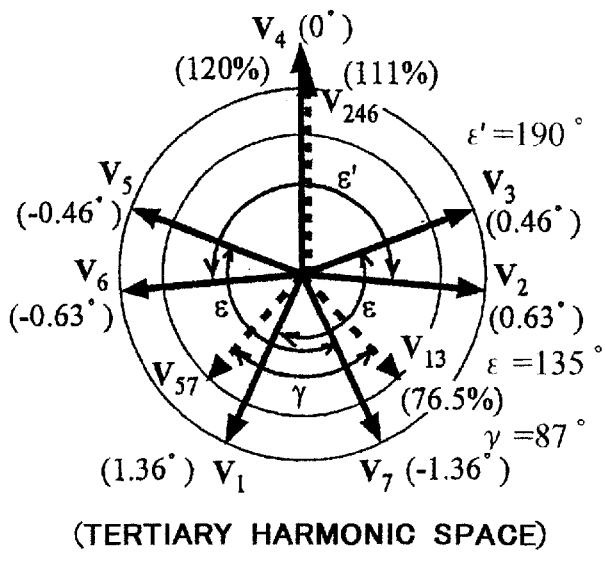
FIG. 17A is an explanation view showing the angular relation of each vector on the tertiary harmonic plane in case that the number of the small teeth is seven.
Figure 17B:
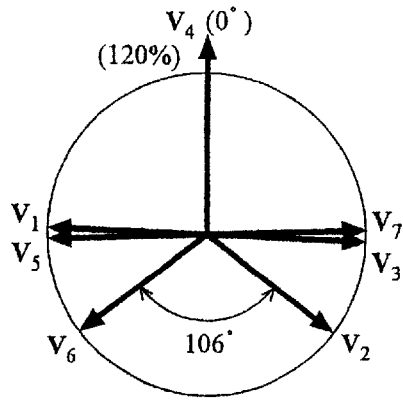
FIG. 17B is an explanation view showing angular relation of each vector on the quaternary harmonic plane in case that the number of the small teeth is seven.
Figure 17C:
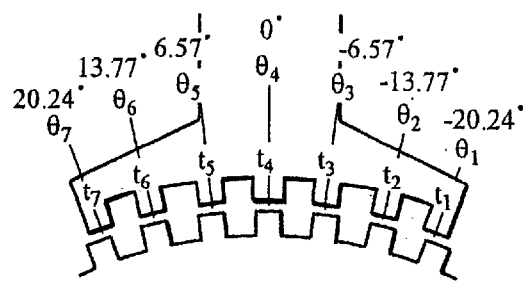
FIG. 17C is an explanation view showing the arrangement of small teeth corresponding to FIG. 17A and FIG. 17B.
Figure 18:
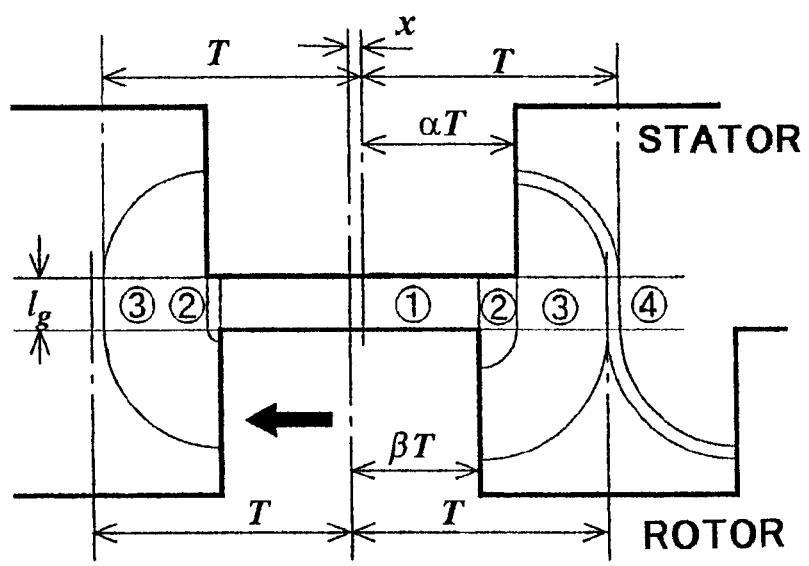
FIG. 18 is an explanation view of imaginary magnetic paths formed between small teeth of a stator and a rotor facing each other.
Figure 19:
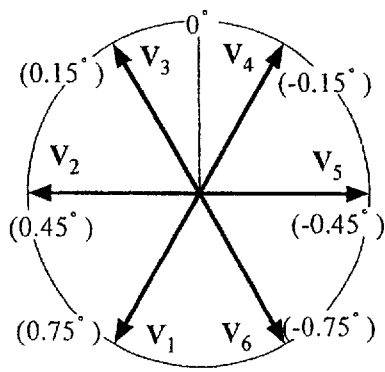
FIG. 19 is an explanation view of vectors on the quaternary harmonic plane in the system of regular pitch arrangement.
Figure 25:
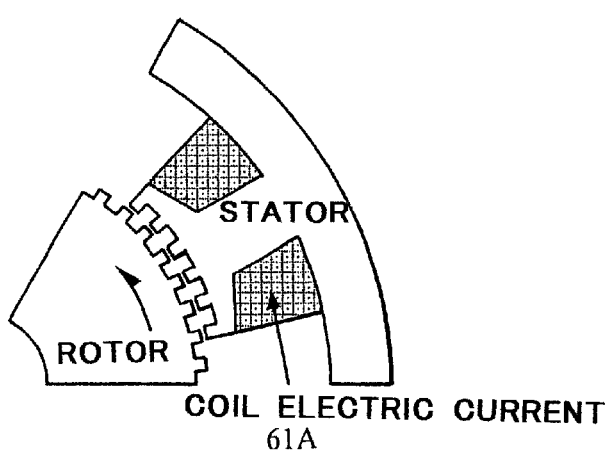
FIG. 25 is an explanation view of a part of a model for analyzing the two-dimensional magnetic field.

(1) The model shown in FIG. 25 in which the part N1 is taken out from FIG. 2 is a target of calculation.

(2) The cogging torque $\tau_{c1}$ (θ) and the flux interlinkage $\phi_1$ (θ) of the part N1 are calculated by performing the magnetic field analysis by using the two-dimensional FEM.

(3) The cogging torque $\tau_{c1}$ (θ) is obtained based on Formula 35.

$$\tau_c(\theta) = 4\sum_{k=1}^{M} \tau_{Ck} = 4\sum_{k=1}^{M} \tau_{Cl}\left(\theta + (k-1)\frac{\pi}{2}\right) \tag{35}$$

(4) The flux interlinkage $\Phi_A$ (θ) of the phase A is obtained based on Formula 36.

$$\Phi_A(\theta)=4[\Phi_{v1}-\Phi_3]=4[\Phi_1(\theta)-\Phi_1(\theta-\pi)] \tag{36}$$

In FIG. 23, there is used a cycle model in which the polarity is reversed in a circumferential direction for the sake of calculation. Therefore, as different from that all the polarities on the N pole side in FIG. 1A are the same, only one polarity is taken out from the arrangement in which different polarities are mixed in the calculation. However, the air gap is very small, and hence it can be considered that a large error can not be produced. Further, since the magnetomotive force added to the air gap by the permanent magnet was simulated for the electric current of the winding, there was used a constant electric current value such that the magnetic flux density of the gap becomes 1.6 T which is close to an actual value.

The cogging torque was calculated by the Maxwell stress method while rotating the rotor up to one pitch (7.2 degrees) of the teeth. As the Maxwell stress, there was used a triangular mesh which has three layers in the radial direction of the center of the air gap and is equally divided in the circumferential direction at 0.15 degree.

The Maxwell stress was calculated by using a mean value of the magnetic flux density of the triangular elements adjacent to each other in the radial direction of the gap central portion.

Figure 26:
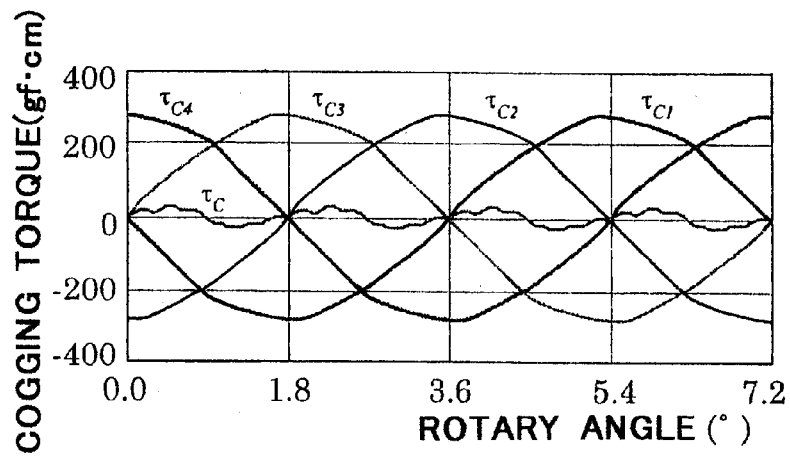
FIG. 26 is an explanation view showing the calculation of a cogging torque by summing torques of magnetic poles.

FIG. 26 shows an example of calculating the cogging torque in the regular pitch arrangement system.

In FIG. 26, each of $\tau_{c1}$, $\tau_{c2}$, $\tau_{c3}$, and $\tau_{c4}$ is torque in Σ of Formula 18. Paying notice to this, it can be found that most of the torque of the respective poles are canceled out and the remainder forms the cogging torque.

Figure 27:
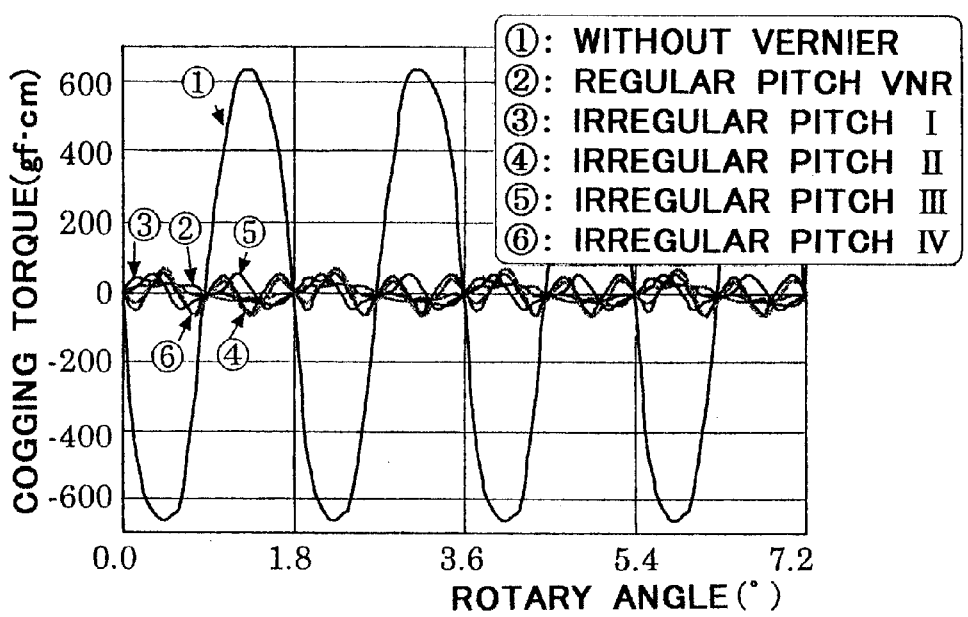
FIG. 27 is an explanation view showing a result of the calculation of the cogging torque.

In FIG. 27, a value obtained by the cogging torque waveform calculation according to the small teeth arrangement methods is compared with a value obtained without vernier. The cogging torque is greatly reduced by each arrangement method as compared with the method using no vernier. In an actual motor, since various kinds of dimensional errors lead to increase in the cogging torque, it can be considered that a difference of this sort is absorbed in irregularities to make little difference.

Figure 28:
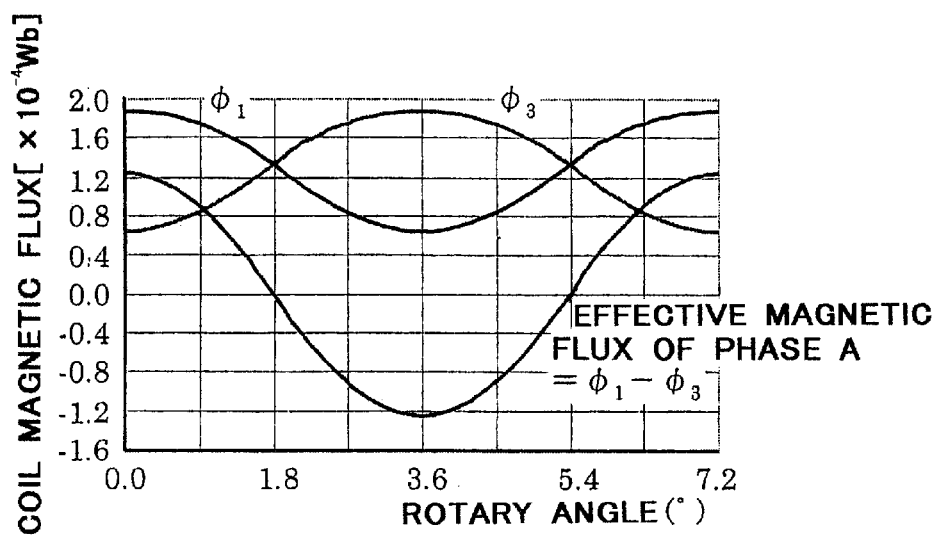
FIG. 28 is an explanation view showing the relation between the effective magnetic flux and the magnetic flux due to the windings.

Since the torque due to an electric current is generated by a product of the back electromotive force of the phase winding and the electric current, evaluation is performed herein in terms of the harmonic distortion of the flux interlinkage which can cause the back electromotive force. FIG. 28 shows an example of calculation of the flux interlinkage in the regular pitch arrangement method. In FIG. 28, $\Phi_1$ and $\Phi_3$ represent magnetic flux in parentheses in Formula 36. Paying notice to $\Phi_1$ and $\Phi_3$, it can be found that there is a large quantity of direct-current magnetic flux and approximately ⅔ of the magnetic flux of the magnet are canceled out each other to be wasted. This means that there is a large quantity of leakage flux because of the structure of the hybrid type stepping motor.

The magnetic flux waveform of the phase A shown in FIG. 28 was resolved into the Fourier series and the harmonic distortion was calculated from the coefficient up to the 15-th order harmonic wave. Based on this result, FIG. 29 shows the relationship between the basic wave of the flux interlinkage and the harmonic distortion with respect to each arrangement method.

Figure 29:
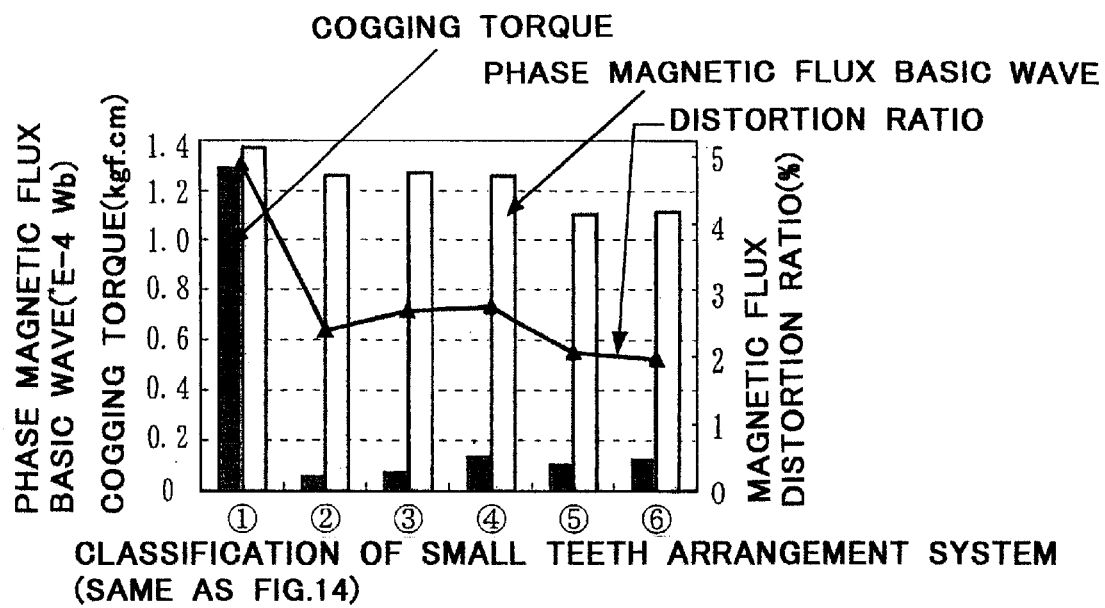
FIG. 29 is an explanation view showing the summary of effects due to the system of small teeth arrangement.

It is to be noted that the results of the cogging torque depicted in FIGS. 29 and 27 are also set right and shown.

Referring to FIG. 29, the method without vernier has approximately 5% of the magnetic flux waveform distortion ratio, meanwhile this ratio is improved to approximately 2.5% in the quaternary harmonic offset methods ②, ③ and ④ and it is improved to approximately 2% in the quaternary and secondary harmonic simultaneous offset methods ⑤ and ⑥. On the other hand, the size of the magnetic flux basic wave is reduced to approximately 7% and approximately 19%, respectively. Although the advantage of improvement in the flux interlinkage waveform by the tertiary harmonic offset can be recognized, it cannot be said that this advantage is quite large.

According to the two-phase hybrid type stepping motor of the present invention, the tertiary and quaternary harmonics can be reduced by the vernier system, wherein a plurality of stator teeth formed on the tip end of the stator pole with the winding is arranged by the irregular pitch, so that the cogging torque and accordingly the vibration and noise can be reduced. Further, the waveform of the torque can be enhanced by varying the arrangement of the small stator teeth formed on the tip end of the stator pole with the winding according to the specific theory.

While the invention has been particularly shown and scribed with reference to the preferred embodiments thereof, it will be understood by those skilled in the art that various changes in form and details may be made therein without departing from the spirit and scope of the invention as defined by the appended claims.

What is claimed is:

1. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an even number of and at least four small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth,
   wherein said small stator teeth are composed of sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero.

2. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an odd number of and at least five small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth,
   wherein said small stator teeth are composed of a set of three small stator teeth including a small teeth positioned at the center of the stator pole and sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero.

3. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an even number of and at least four small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth,
   wherein said small stator teeth are composed of sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero, and that a vector sum of the tertiary harmonics of a synthetic vector of permeances of the sets becomes substantially zero.

4. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having an odd number of and at least five small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth,
   wherein said small stator teeth are composed of a set of three small stator teeth and sets of two small stator teeth of the same width, and at least one pitch of the adjacent teeth is different from the other pitch of the other adjacent teeth, so that a vector sum of the quaternary harmonic of permeance of the small stator teeth included in each of said sets becomes substantially zero, and that a total sum of synthetic vector of permeances of the sets on the tertiary harmonic space substantially zero.

5. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phases each wound around each stator pole, each of said stator poles having a multiple number of six small stator teeth at the tip end thereof, said rotor having two spelitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of at least two sets of three small stator teeth, and at least one pitch of the adjacent teeth is different from the other pitch of the other adjacent teeth, so that a vector sum of the tertiary harmonic of permeance of the three, small stator teeth included in each of said sets becomes substantially zero, and that a vector sum of permeances of axialsymmetric two small stator teeth on the quaternary harmonic plane of two sets becomes substantially zero.

6. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phases each wound around each stator pole, each of said stator poles having a multiple number of six small stator teeth at the tip end thereof, said rotor having two spelitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of at least three sets of two small stator teeth, and at least one pitch of the adjacent teeth is different from the other pitch of the other adjacent teeth, so that a vector sum of the tertiary harmonic of permeance of the two small stator teeth included in each of said sets becomes substantially zero, and that a vector sum of permeances of three small stator teeth which are separated by 120° from each other on the quaternary harmonic plane of three sets becomes substantially zero.

7. A two-phase hybrid type stepping motor comprising a stator and a rotor arranged concentrically with the stator and with an air gap therebetween, said stator having an annular stator yoke, a plurality of stator poles extending radially and formed at a regular pitch on the inner peripheral surface of the annular stator yoke, and stator windings of two-phase each wound around each stator pole, each of said stator poles having a mutiple number of three small stator teeth at the tip end thereof, said rotor having two splitted rotor elements and a permanent magnet held therebetween and magnetized so as to form N and S poles in the axial direction thereof, and a plurality of small rotor teeth formed at a regular pitch on the outer peripheral surface of each of said rotor elements, said two splitted rotor elements being shifted from each other in angular position by a ½ pitch of the small rotor teeth, wherein said small stator teeth are composed of a plurality of sets of three small stator teeth and at least one pitch of the adjacent teeth is different from the other pitch of the other adjacent teeth, so that a vector sum of the quaternary harmonic of permeance of the three small stator teeth included in each of said sets becomes substantially zero.

* * * * *